Sept. 9, 1969          L. C. SIMMONS          3,465,691
                       TIEDOWN SYSTEM
Filed Aug. 3, 1966                           2 Sheets-Sheet 1

INVENTOR.
LAWRENCE C. SIMMONS
BY
Bosworth, Sessions,
Herrstrom & Knowles.
ATTORNEYS Sept. 9, 1969  L. C. SIMMONS  3,465,691
TIEDOWN SYSTEM Filed Aug. 3, 1966  2 Sheets-Sheet 2

INVENTOR.
LAWRENCE C. SIMMONS
BY
Bosworth, Sessions,
Herstrom & Knowles
ATTORNEYS

United States Patent Office 3,465,691
Patented Sept. 9, 1969

3,465,691
TIEDOWN SYSTEM
Lawrence C. Simmons, Cleveland, Ohio, assignor to Cleveland Technical Center, Inc., Cleveland, Ohio, a corporation of Delaware
Filed Aug. 3, 1966, Ser. No. 570,018
Int. Cl. B61d 3/16, 45/00
U.S. Cl. 105—368          10 Claims

ABSTRACT OF THE DISCLOSURE

A tiedown system for securing a vehicle to a carrier. At each of four locations on the body of the vehicle are provided two lengths of strand material extending in opposite directions longitudinally of the vehicle. The lower ends of the strand lengths are separated while the upper ends of the strand lengths approach each other and are affixed to the vehicle body. The lower ends of the strand lengths are affixed to separate block means movable longitudinally in guide means. Means are provided for positively moving the block means away from each other and toward each other to tighten or loosen the strand lengths.

---

This invention relates to tiedown means and more particularly tiedown means for tying down a carried vehicle on a carrier vehicle.

While the invention may be used for tying down various types of carried vehicles on various types of carrier vehicles, it provides particular advantages when employed in tying down automobile vehicles, such as passenger vehicles, on railroad cars, and will be discussed hereafter primarily in connection with such use.

Since in passenger automobiles the body is supported from the wheels by springs, it has been found necessary to tie down the body of the automobile to the carrier car to prevent excessive springing action between the body and the wheels of the automobile when the carrier car is subjected to substantial shocks as could occur in switching or high speed travel. Excessive springing could cause damage to springs or shock absorbers, and might cause the highest automobiles in a conventional multi-deck carrier car to exceed permissible clearance heights as their bodies rise on unrestrained spring action.

In conventional practice, the automobiles are usually tied down to the carrier car by chains fixed to four locations of each auto body and to four chain carriages that are disposed in two parallel racks extending longitudinally of the auto body inside the wheels. Each chain carriage can be adjustably located and locked in place on the rack. Each carriage contains a winch to which is permanently secured one end of the chain the other end of which is fixed to the automobile body; the axle of the winch has a ratchet and a wrench head. A pawl is arranged to lock the ratchet against one direction of rotation of the winch. On each chain carriage the winch is rotated by a manually operated wrench to wind the chain and pull the automobile down toward the carriage; when the automobile is pulled down to about half its spring travel the pawl is locked in position. This must be done progressively, starting at both sides of the front of one auto and then at the rear. In order to provide some longitudinal stability for the automobile, the four carriages are usually arranged to cause the chains to extend at angles of about 45° in longitudinal direction of the automobile, the chains at the front of the automobile being inclined toward the front of the automobile and being oppositely inclined to those at the rear of the automobile.

When the chains are arranged in such angular relation only two chains, either the two at the front or the two at the rear of the automobile, are under stress in the event of a longitudinal shock depending on the direction of such shock, as can occur during switching of railroad cars or from rapid accelerations or decelerations.

In some cases, the chains connecting the automobile frame to the carriages and the racks have been arranged generally vertically. However, when the chains are thus arranged vertically, all four chains may be stressed under the influence of a longitudinally directed shock on the carrier car, but the automobile may move so much longitudinally before the chains become effective that the automobile may be damaged or cause damage by striking adjacent vehicles or the carrier car.

Furthermore, such prior tiedown systems have not been as rapidly or readily installed or removed as is desirable, and can cause difficulties or danger because of failure of the ratchet mechanisms.

In general, preferred tiedown systems should be connected to the automobile body and the carrier car to avoid the above mentioned problems from excessive spring action. It should not permit substantial longitudinal movement of the tied-down vehicle in the event of abrupt longitudinal shocks imparted to the carrier vehicle, to prevent the tied-down vehicle from damaging itself or adjacent vehicles from striking adjacent vehicles or the carrier car. It should also securely hold the tied-down vehicle in place despite shocks or vibrations that might be encountered in movement of the carrier vehicle. It should be simple and rapidly installed and removed. It should have a low initial first cost, low maintenance cost, and be dependable and safe in its action and during installation or removal.

It is an object of the present invention to provide tiedown apparatus that can meet all of the above and other requirements, and overcome the above indicated disadvantages of prior systems. Another object is the provision of a tiedown system that can securely hold the carried vehicle in place on the carrier vehicle, despite substantial shocks that might be supplied to the carrier vehicle, without damage to the carried vehicle or any other vehicle, which tiedown system can be rapidly connected to and disconnected from the carried vehicle. Another object is the provision of such apparatus which is strong and dependable, can be manufactured and maintained at a reasonable cost.

The tiedown system provided by the present invention comprises strand means at each of four locations on the body of a carried vehicle, each of which strand means comprises two lengths, such as lengths of chain, extending in opposite directions longitudinally of the vehicle. The lower ends of the strand means are separated while the upper ends of the strand means approach each other and are fixed to the automobile body. Preferably in this tiedown system there are four tiedown means, in each of which each lower end of the two strand means is connected to block means that is adapted to slide longitudinally in, but is restrained against substantial lateral movement relative to, guide means fixed to the carrier below the carried vehicle body. Actuating means are provided to move the block means away from each other to tighten the strand lengths. Preferably, rotatable threaded actuating means engages opposite hand threads in the block means so that when the actuating means is rotated, the block means will move toward or away from each other, depending on the direction of rotation. If desired, means may be located on the guide means to limit movement of the block means beyond their extended positions on the guide means.

The above and other objects of the invention will become apparent from a description of the following preferred embodiment of the invention, in connection with the accompanying drawings in which:

3

Figure 3:
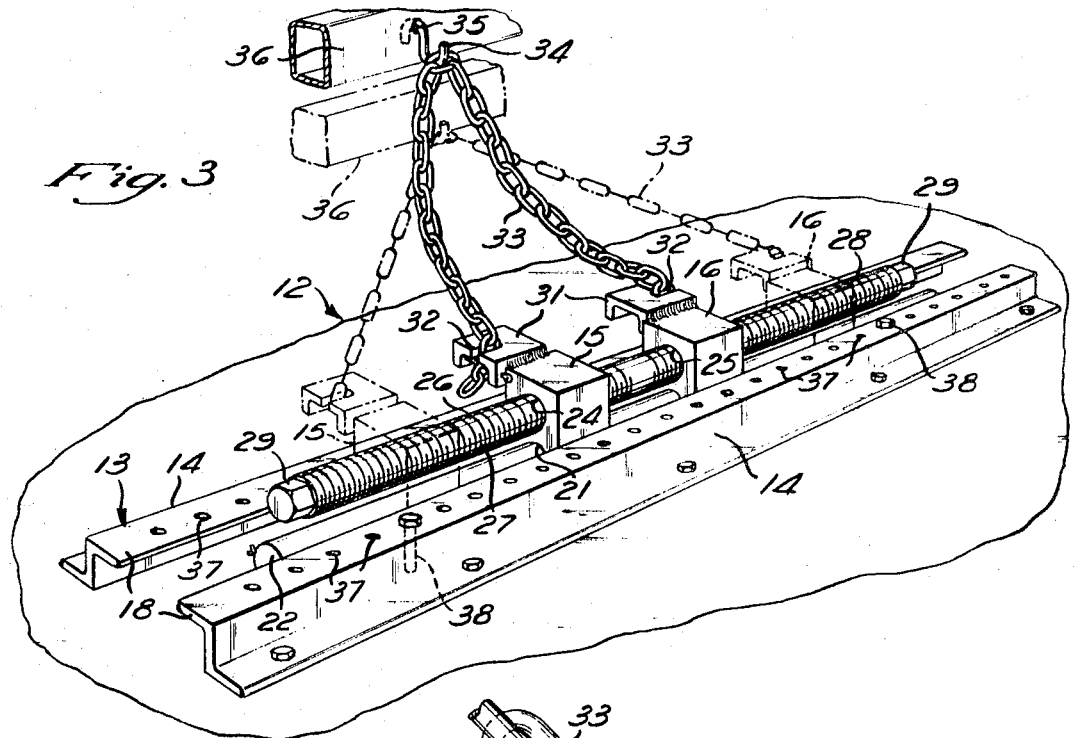
Figure 4:
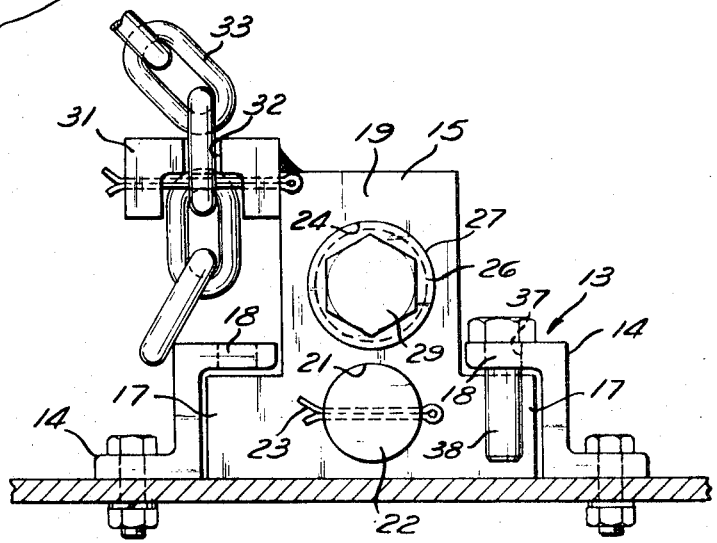

FIGURE 3 is an enlarged perspective view of one of the tiedown means embodying the invention, the chain and block means being shown in full lines in the positions they assume before the apparatus is tightened and in broken lines in the positions they assume after the apparatus is tightened; and FIGURE 4 is an end elevation of the left end of FIGURE 3 but to a larger scale showing the left block means of FIGURE 3 and a portion of the chain connected thereto.

Figure 1:
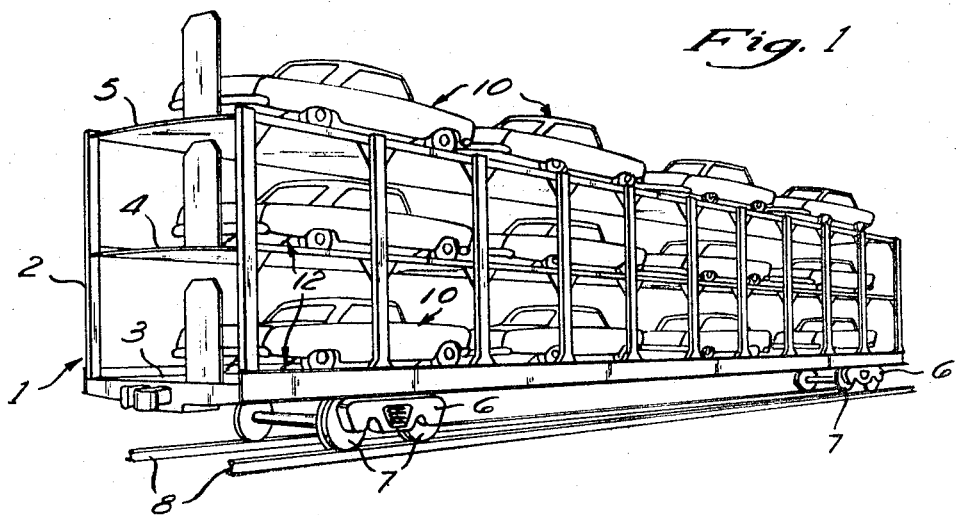
FIGURE 1 is a perspective of a conventional triple deck railroad carrier car for carrying passenger automobiles, on which car the automobiles are held in place by a tiedown system embodying the present invention.

FIGURE 1 shows a conventional three-decker automobile carrier railroad car 1, comprising a body portion 2 having lowermost, intermediate and top decks 3, 4 and 5, the body portion being mounted on conventional trucks 6 having wheels 7 on conventional channels 8.

Figure 2:
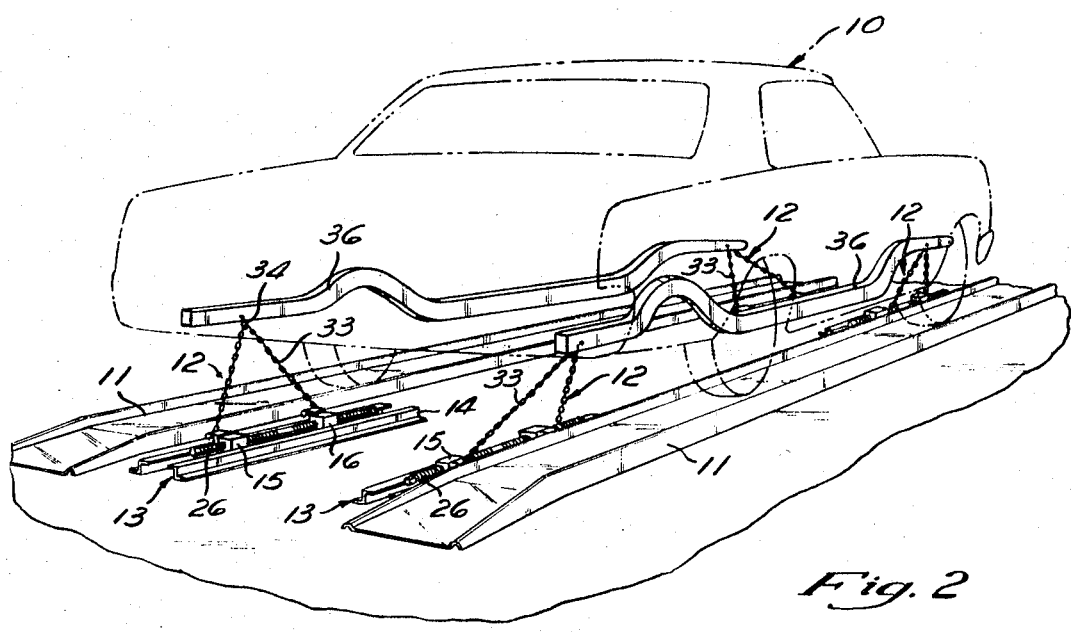
FIGURE 2 is a perspective to a scale larger than FIGURE 1 of a passenger automobile, most of which, except its longitudinal frame members, is shown in phantom broken lines, to show how the tiedown system of the present invention secures the automobile to the carrier car.

Passenger automobiles are carried on channel members 11 fixed to the decks 3, 4 and 5, having been driven thereon in the usual manner. The automobiles 10 are each held in place by a tiedown system embodying the invention, comprising four tiedown means generally indicated by reference numeral 12. (FIGURES 1 and 2).

Each tiedown means 12 (FIGURES 2, 3, 4) comprises a guide 13 made up of two rolled steel Z-section beams 14 fixed, as by bolting, to one of the decks 3, 4 or 5 below the vicinity of a location on the automobile where a tiedown connection is to be made. These beams 14 are fixed in parallel facing relation.

Two essentially identical separate block members 15, 16 are mounted between the beams 14, each having two laterally projecting portions 17 that extend under the flanges 18 and a central portion 19 that extends upwardly between the flanges 18. The block members are thus firmly secured against any appreciable lateral movement relative to the beams 14, while fitting loosely enough between the beams to permit longitudinal movement with respect to the guide 13 formed by the beams. Each block member has in its lower portion an opening 21 through which slidably extends a closely fitting guide rod 22 that aids in keeping the block members aligned, prevents them from twisting or moving laterally relative to each other, and prevents binding of the blocks in the guide means. Pins 23 act as stop means for preventing removal of the rod from the block members and limitting outward movement of each block member relative to the guide rod.

Block members 15 and 16 respectively have threaded through openings 24 and 25, the threads in openings 24 and 25 being of opposite hands. An elongated actuating screw member 26 is threaded in both such openings, member 26 having axially-spaced threaded portions 27 and 28 that match and engage the threads of openings 24 and 25 of block members 15 and 16. Consequently, when member 26 is rotated in one direction, as by a wrench engaging either hexagonal end portion 29, block members 15 and 16 are caused to move toward each other; and when member 26 is rotated in the other directiion block members 15 and 16 are caused to move away from each other.

Each block member also rigidly carries a laterally extending strand-engaging portion 31 having open ended slots 32. These slots of the two portions 31 face in opposite directions toward the free ends of the actuating member 26. A chain 33 has its ends engaged in these slots, which are wide enough and long enough to engage a link of the chain.

The portion of the chain length between the slots 32, preferably the center, engages a hook 34 that engages one

4 of the tiedown holes 35 in the frame member 36 of the automobile 10. Holes 35 usually are formed at the factory for tiedown purposes, either outboard or inboard of the adjacent automobile wheels, or outboard one pair and inboard the other.

The top flanges 18 of the two beams 14 and the guide 13 of individual tiedown means have holes 37 at spaced intervals, adapted to receive studs or pins 38 which limit outward movement of the block members 15 and 16, as shown in FIGURES 3 and 4.

An illustrative procedure for connecting an automobile to a railroad carrier car by means of such a tiedown system is as follows:

If necessary, the block members 15 and 16 of each of the four tiedown means for an automobile are moved toward each other by rotation of actuating member 26, to provide sufficient length of chain 33. The guides 13 have been previously properly located, although one location will fit a wide variety of sizes of automobiles. A predetermined length of chain 33, which has been selected in accordance with the type of automobile to be anchored, is anchored to both block members 15 and 16 of each tiedown means 12 by having its end portions slid into the slots 32 of the anchoring means 31.

The automobile 10 is then driven onto the channels 11 of the rail car in the usual manner, and is halted at approximately the proper position. A hook 34 is installed in each of the four holes 35 of the frame of the automobile, as shown in FIGURE 2, and the center of the chain for the associated tiedown means engaged with the hook by slipping a chain link over the hook. The stop studs 38 are then put in the proper holes 37 of the guide, these holes being selected for the particular type and location of the automobile. The actuating member 26 is rotated, either by a manual or power-driven wrench until the block members are stopped by the studs 38. This moves the automobile longitudinally, forwardly or rearwardly, if it had not been properly located longitudinally relatively to the tiedown means. Since the chain has been selected to be of the proper length, the frame of the car is pulled down a substantial distance when the chain is tightened, as is indicated in broken lines in FIGURE 3. When each tiedown means, as is preferable, has symmetrically located equal chain lengths between the blocks and the hooks, it is not necessary to select any particular order of connection of the chain to the automobile, or tightening of the actuating means to tighten the chain; furthermore, it is not necessary to perform the time-consuming operation of partially tightening each tiedown means on all four corners of the car and progressing around until finally they are all tightened to their ultimate degree, as is usually necessary in prior practice.

After all four tiedown means have been installed on each automobile, the arrangement preferably is as shown in FIGURE 2. At each tiedown means there are two lengths of chain connecting the frame of the car to the tiedown means which is located on the deck, the lengths of chain being preferably equal so that the angles that each length of chain makes with the deck are equal. Preferably the lengths of chain for each tiedown means are inclined outwardly so as to provide increased lateral stability.

To disconnect, each actuating member 26 is rotated to move the block members 15 and 16 toward one another, and once sufficient slack has developed in the chain the hook can be disengaged from the frame. The chains can be left to lie loose on the deck while having their ends connected to the block means for a subsequent shipment, if desired.

Numerous advantages are also provided by tiedown means embodying the invention. Among these are the following.

The stress on each length of chain in a tiedown means of the invention is only one-half of the stress that would occur if a single length of chain was used at each of the four locations as is common in the prior art. If the carrier car should be subjected to a longitudinally directed shock of substantial magnitude, which would tend to move the automobile body lengthwise relative to the carrier car, there will be at each of the four tiedown locations a length of chain that is under load, so there will be four chains anchoring the automobile body to the carrier rather than two as in prior practice; stresses in chains, and localized stresses on the auto frames would be reduced by one-half over prior art conditions.

The longitudinal distances between the stop studs 38 will limit the amount that the automobile body is pulled down once these distances are predetermined for a given size or type of automobile. Since the resultant pull on the automobile frame at each location is essentially vertical, the automobile once properly located is not moved during the tiedown operation so there is no need of a particular order of tightening and no need of partially tightening the tiedown systems until they are ultimately tightened. The system produces no severe strain on the automobile body either under nonimpact conditions or under impact conditions.

The tiedown means of the invention can move the automobile to its correct position longitudinally of the railroad car on initial tightening of the chains, so it is not necessary that the automobiles be located exactly for proper clearance between adjacent automobiles, which saves loading time. Furthermore, since at each tie means the block members move simultaneously and equidistantly toward each other on loosening of the tie means, there is no danger of an automobile moving longitudinally by loosening and removal of the tiedown means.

The apparatus of the invention is usable on automobiles without change to the automobiles, providing that they have tiedown holes. The locations of the guides 13 can be changed as required to adapt the location to different types of vehicles, although because of the possibility of locating the blocks and their actuating screws at different locations relative to the lengths of their guides 13, and because of the transversely inclined arrangements of the chains, a wide variety of different lengths and widths of vehicles can be accommodated without changing the positions of the racks. The chains do not require permanent attachment of hooks to the chains, and the chains may be replaced easily if they become broken or worn. The chains cannot loosen from twisting, and since they are not wound on any ratchet winch device they cannot loosen due to a change in the lay on the winch. This eliminates the need of idler carriages. The chain can be so located that it will never fall behind a wheel of the automobile.

The wrench for turning the threaded actuating member can be a standard manually operated socket wrench, or if desired a power-driven wrench that substantially increases speeds of tying down the automobiles and releasing them and also avoids possibility of damage to the automobiles that can arise with long-handled, manually operated socket wrenches.

The operation is so simple that no detailed instructions are required, and the tiedown and release of each automobile can be accomplished by one operator. There is no danger to operators because there are no locks or pawls in the vicinity of spring-loaded pulleys that could inadvertently release or break.

Maintenance is lower than on conventional systems. Fastenings may be replaced en route without difficulty or delay. It is not necessary to use repair links in the chains since the chains as a whole can be replaced readily. Securing of the automobile is improved as the number of places that failure can occur is reduced.

The apparatus properly secures the automobile and also locates it despite longitudinal or transversely directed shocks. It can be manufactured and installed at low cost and is rugged and foolproof in operation.

While the apparatus has been disclosed in connection with tying down automobiles on railway cars, it can be used for tying down automobiles on truck-drawn trailers. Furthermore, it could be used for tying down trucks or truck trailers or other vehicles on flatcars or other carrier vehicles, with advantages similar to those described above.

Those skilled in the art will appreciate that various changes and modifications can be made in the disclosed embodiments of the invention, and that the invention can be used otherwise than disclosed above, without departing from the spirit or the scope thereof. The essential characteristics of the invention are described in the appended claims.

What is claimed is:

1. A system for securing to a carrier vehicle a carried vehicle having wheels and a body supported from said wheels by springs, said means comprising a plurality of tiedown means each of which comprises two lengths of strand material connected at their upper ends to the body of the vehicle and extending downwardly in divergent relation to and toward the carrier vehicle with their lower ends spaced relatively to each other in a direction extending longitudinally of the carried vehicle and fixed to separate block means movable longitudinally in guide means fixed to said carrier vehicle, single operating means for positively and simultaneously moving said block means relatively away from each other in said guide means and for permitting movement of said block means relatively toward each other in said guide means, and means for limiting outward movement of said block means, whereby when said block means are located nearer to each other said lengths of strand material are loose and when said block means are positively moved away from each other said strand lengths are tightened to exert a downward pull on said body of said carried vehicle and to restrain the longitudinal movement of said carried vehicle with respect to said carrier vehicle.

2. The apparatus of claim 1 in which there are four of said tiedown means, two being fixed to the rear portion of the body of the carried vehicle and two being fixed to the front portion of the body of the carired vehicle.

3. The apparatus of claim 1 in which the carried vehicle has four wheels arranged in pairs and two of said tiedown means are fixed to the body of the vehicle in the vicinity of one of said pairs of wheels and two of said tiedown means are connected to the body of the vehicle in the vicinity of the other of said pairs of wheels.

4. The apparatus of claim 1 in which said means for moving said block means comprises coaxially located threaded openings in said block means in which the threads are of opposite hands in said block means, and elongated rotatable actuating means having two threaded portions of opposite hands thereon that are threaded in said block means so that rotation of said actuating means in one direction causes said block means to travel toward each other and rotation of said actuating means in the opposite direction causes said block means to travel away from each other.

5. The apparatus of claim 1 comprising second guide means independent of said first mentioned guide means for engaging and guiding both said block means relative to each other as they move toward and away from each other.

6. The apparatus of claim 5 comprising stop means associated with said second guide means for limiting the distance that at least one of said block means can move outwardly relative to said second guide means.

7. The apparatus of claim 4 in which there are four of said tiedown means, two being fixed to the rear portion of the body of the carried vehicle and two being fixed to the front portion of the body of the carried vehicle.

8. The apparatus of claim 4 in which the carried vehicle has four wheels arranged in pairs and two of said tiedown means are fixed to the body of the vehicle in the vicinity of one of said pairs of wheels and two of said tiedown means are connected to the body of the vehicle in the vicinity of the other of said pairs of wheels.

9. Apparatus for securing a carried article to a carrier comprising first elongated guide means adapted to be fixed to said carrier; two separate block means slidably mounted in said first guide means for movement longitudinally of said guide means but restrained against substantial movement laterally of said guide means; means for positively moving said block means away from each other in said guide means, and for permitting movement of said block means toward each other in said guide means comprising coaxially located threaded openings in said block means in which the threads are of opposite hands in said block means, and elongated rotatable actuating means having two threaded portions of opposite hands thereon that are threaded in said block means so that rotation of said actuating means in one direction causes said block means to travel toward each other and rotation of said actuating means in the opopsite direction causes said block means to travel away from each other; second elongated guide means independent of said first guide means for engaging and guiding both of said guide means to prevent any appreciable lateral or twisting movement of either of said block means relative to each other; strand means fixed to said block means and adapted to be connected to said carried article so that two lengths of said strand means converge from said block means toward the location spaced from said block means at which they are attached to the body of said carried vehicle, whereby when said block means are located nearer to each other said lengths of strand means are loose and when said block means are positively moved outwardly away from each other said strand lengths are tightened to exert a downward pull on said body of said carried vehicle; and stop means associated with said first guide means for limiting the distance that at least one of said block means can move outwardly relative to said first guide means.

10. The apparatus of claim 9 comprising stop means associated with said second guide means for limiting the distance that at least one of said block means can move outwardly relative to said second guide means.

References Cited

UNITED STATES PATENTS

| | | | |
|---|---|---|---|
| 2,023,972 | 12/1935 | Otis | 105—368 |
| 2,227,870 | 1/1941 | Thomas | 105—368 |
| 2,874,992 | 2/1959 | Erickson | 296—1 |
| 2,942,912 | 6/1960 | Lucas et al. | 280—179 X |
| 2,996,021 | 8/1961 | Clejan | 105—368 |
| 3,054,363 | 9/1962 | Baker | 105—368 |
| 546,518 | 9/1895 | Fountain | 280—179 |
| 2,768,004 | 10/1956 | Wagner | 280—179 |

DRAYTON E. HOFFMAN, Primary Examiner

U.S. Cl. X.R.

105—369; 248—361; 296—1